(12) United States Patent
Biskeborn et al.

(10) Patent No.: US 9,159,359 B2
(45) Date of Patent: Oct. 13, 2015

(54) TAPE MEDIA KISS-CONTACT READ VERIFICATION

(71) Applicant: International Business Machines Corporation, Armonk, NY (US)

(72) Inventors: Robert G. Biskeborn, Hollister, CA (US); Calvin S. Lo, Saratoga, CA (US); Tak H. Wong, Hong Kong (CN); Xu Yan, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/552,559

(22) Filed: Nov. 25, 2014

(65) Prior Publication Data

US 2015/0255110 A1    Sep. 10, 2015

Related U.S. Application Data

(63) Continuation of application No. 14/198,198, filed on Mar. 5, 2014, now Pat. No. 8,964,319.

(51) Int. Cl.
| | |
|---|---|
| *G11B 21/02* | (2006.01) |
| *G11B 5/584* | (2006.01) |
| *G11B 20/10* | (2006.01) |
| *G11B 27/36* | (2006.01) |
| *G11B 5/58* | (2006.01) |

(52) U.S. Cl.
CPC .......... *G11B 20/10472* (2013.01); *G11B 5/581* (2013.01); *G11B 20/10305* (2013.01); *G11B 20/10388* (2013.01); *G11B 27/36* (2013.01)

(58) Field of Classification Search
CPC .. G11B 19/04; G11B 20/00086; G11B 5/584; G11B 5/55508; G11B 27/36; G11B 2220/90; G11B 5/6005; G11B 5/59633; G11B 5/54; G11B 5/5508; G11B 5/60
USPC ........... 360/31, 27, 77.12, 53, 60, 75, 231, 83
See application file for complete search history.

(56) References Cited

U.S. PATENT DOCUMENTS 5,055,959 A    10/1991    Saliba
(Continued)

FOREIGN PATENT DOCUMENTS

EP    0666567 A1    8/1995

OTHER PUBLICATIONS

Biskeborn et al., "Tape Media Kiss-Contact Read Verification," Filed on Mar. 5, 2014, p. 1-46, U.S. Appl. No. 14/198,198.
(Continued)

*Primary Examiner* — Nabil Hindi
(74) *Attorney, Agent, or Firm* — David Zwick; Randall J. Bluestone

(57) ABSTRACT

A supplemental module that includes one or more read elements periodically engages a magnetic recording medium, and the read elements generate an electrical signal corresponding to transitions written to the magnetic recording medium by a write element. A computer receives information representative of the electrical signal and determines if a quality metric of the magnetic recording medium derived from the electrical signal is within a defined range. If the quality metric is not within the defined range, a defined action is performed by the computer.

10 Claims, 10 Drawing Sheets

(56) References Cited

U.S. PATENT DOCUMENTS

| | | | |
|---|---|---|---|
| 5,339,202 A | | 8/1994 | Heinz et al. |
| 5,592,341 A | | 1/1997 | Hadfi |
| 7,102,845 B2 | * | 9/2006 | Saliba et al. .............. 360/77.12 |
| 7,139,141 B1 | | 11/2006 | Cates et al. |
| 7,184,379 B2 | | 2/2007 | Tsukihashi et al. |
| 7,692,887 B2 | | 4/2010 | Dolan, Jr. et al. |
| 7,729,072 B2 | | 6/2010 | Dahle et al. |
| 8,000,052 B2 | * | 8/2011 | Fry et al. ......................... 360/53 |
| 8,406,096 B1 | | 3/2013 | Edling et al. |
| 8,665,560 B1 | | 3/2014 | Biskeborn et al. |

OTHER PUBLICATIONS

Hess, "Tape Degradation Factors and Challenges in Predicting Tape Life," ARSC Journal, 2008, p. 240-274, vol. XXXIV, Issue ii, ARSC Conference Paper, Association for Recorded Sound Collections, USA.

McKnight, "Calculating the Short-wavelength Response of the Magnetic Recording and Reproducing Processes—a Historical Review," AES, Nov. 2, 2012, p. 1-6, Magnetic Reference Laboratory, San Jose, CA.

\* cited by examiner

TAPE MEDIA KISS-CONTACT READ VERIFICATION

FIELD OF THE INVENTION

The present invention relates generally to the field of magnetic information storage and retrieval, and more particularly to determining signal characteristics from recorded data on a magnetic recording media to determine quality metrics associated with the media and recorded data.

BACKGROUND OF THE INVENTION

Archival recording to tape and other magnetic media may require that the magnetic media be written with a high degree of quality to satisfy auditing, retention, and other mission critical requirements. For example, the write quality on master or reference tapes in the media and entertainment industry may be extremely critical. Typical tape drives and other tape recording appliances are not configured to accurately determine when writing degrades, but is still within an acceptable range.

SUMMARY

Embodiments of the present invention disclose a method and apparatus for determining quality metrics of a magnetic recording medium. A supplemental module that includes one or more read elements periodically engages a magnetic recording medium, and the read elements generate an electrical signal corresponding to transitions written to the magnetic recording medium by a write element. A computer receives information representative of the electrical signal and determines if a quality metric of the magnetic recording medium derived from the electrical signal is within a defined range. If the quality metric is not within the defined range, a defined action is performed by the computer.

DETAILED DESCRIPTION

Figure 1A:
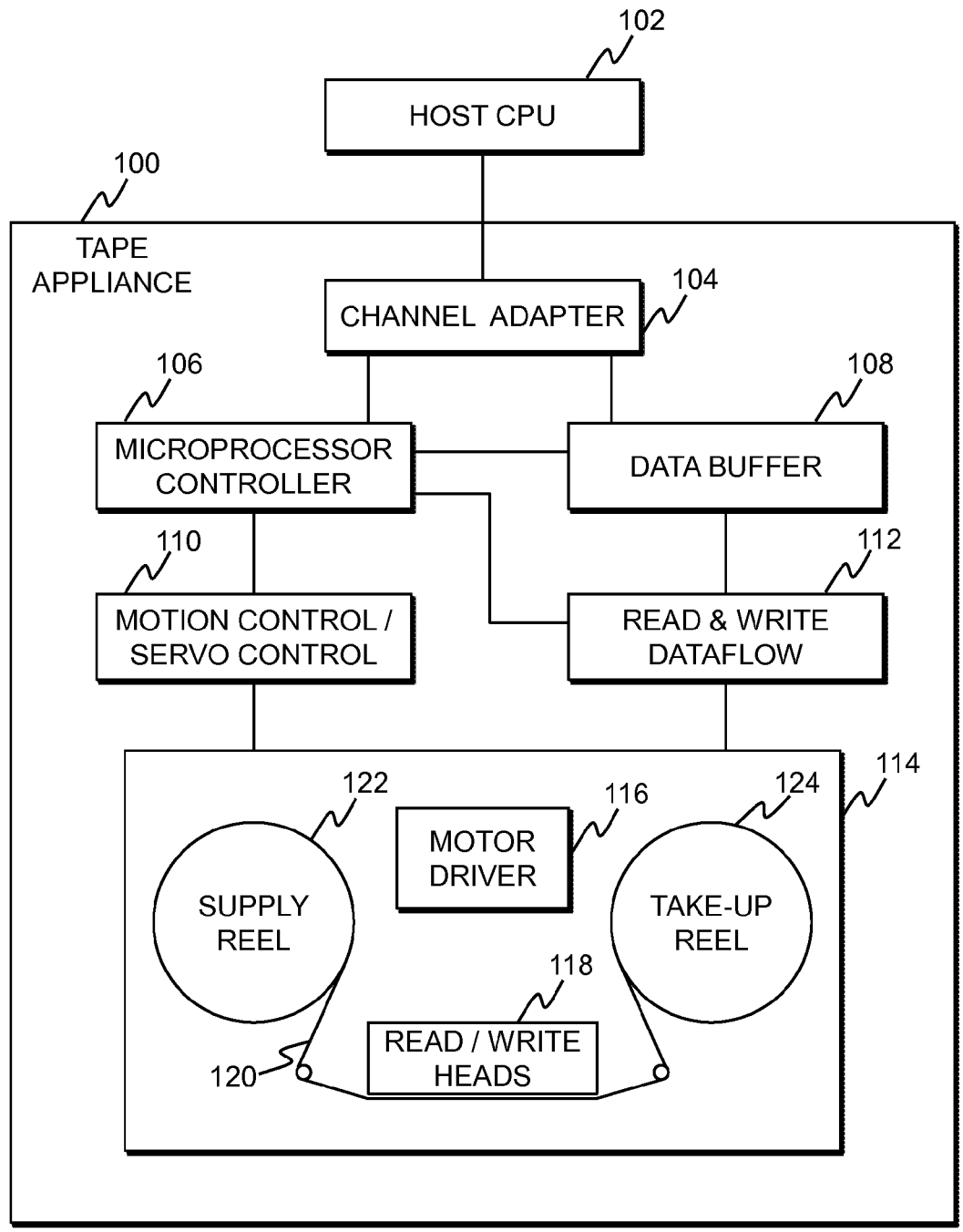
FIG. 1A is a functional block diagram illustrating a tape recording appliance, in accordance with an embodiment of the present invention.

The present invention is directed generally to magnetic storage devices, such as tape appliances, that include a supplemental read module, in addition to the regular "production" read/write modules of a read/write head, that is used for determining the performance characteristics and quality metrics of the write elements in the regular read/write modules and recorded magnetic media. Tape drives, for example, typically include mechanisms to ensure that data is accurately written to tape. However, some of these mechanisms, such as error recovery, may mask problems that may be occurring at the write elements. For example, a tape drive performing a read-after-write operation may detect an error, and automatically rewrite the data to the tape. If the cause of the data error is degradation of a write element, the degradation may have to progress substantially before the error rate is considered unacceptable, and a notification is generated by the tape drive. While degradation is progressing, effective write speeds and data density may be worsening. These secondary effects may be the first indication that written data quality is deteriorating.

While poor overall quality of data written to a magnetic medium may not be efficient, as long as the data can be read, the poor quality may satisfy data retention requirements mandated by statute, policies, or procedures. However, certain archival applications, such as the creation of master or reference tapes in the media and entertainment industry, may require, for example, by contract, that the data written to an archival tape be of very high quality. Such quality may be defined by metrics such as a low bit error rate (BER), high signal-to-noise ratio (SNR), high magnetic field strength of data recorded to the magnetic medium, a small transition parameter, a small PW50 pulse width, a high degree of overwrite, and/or other metrics that are known in the industry or defined by agreement. The quality levels defined by agreement may be significantly more stringent than the acceptable levels of the magnetic recording device, as may be defined by standards and/or specifications, such as ECMA-319. It would be advantageous to have a system that can detect degradation of the write quality of a write element before the degradation has progressed to the point that the data quality is out of specification.

In embodiments of the invention, a supplemental module that includes a read element array periodically engages a magnetic medium, such as a magnetic tape, and reads data, such as production data or test patters, and erased media, from data tracks to determine the quality of the write elements in the production read/write modules. The supplemental read module may periodically "kiss" the magnetic medium, via, for example, a precision servo system that moves the module or the magnetic medium. Information determined from the electrical signals generated by the read elements may be used to detect and determine the performance of the write elements, or the read/write element arrays in which the write elements are disposed. Because the supplemental module is only periodically in contact with the magnetic medium, the performance characteristics of the supplemental module and its read elements are not expected to change or degrade appreciably over the life of the magnetic storage device, or another defined time period. In certain embodiments, a coating may be applied to the read element array of the supplemental module, and/or the read elements may be recessed, so as to force a defined separation between the read elements and the tape. This may force an extra degree of spacing loss in the magnetic field strength detected by the read elements such that the signal resolution may be close to the minimum acceptable value, and may be used to detect sub-optimal, but within specification, performance of the read/write element arrays of the other read/write modules. A better understanding of certain aspects of the embodiments presented herein may be gained by reference to U.S. patent application Ser. No. 13/741,352, filed Jan. 14, 2013, which is hereby incorporated herein by reference in its entirety.

While embodiments of the invention are described with respect to a tape appliance and a magnetic tape medium, those of skill in the art will recognize that the inventive concepts described herein may be implemented in embodiments directed to related magnetic storage technologies, such as hard disk drives (HDDs), without undue experimentation, and without departing from the spirit of the invention, and these are, therefore, considered to be within the scope of the invention, as defined in the claims below.

For purposes of the description hereinafter, the terms "upper", "lower", "right", "left", "vertical", "horizontal", "top", "bottom", "outer", "inner", and derivatives thereof shall relate to the disclosed structures and methods, as oriented in the drawing figures. The terms "overlying", "atop", "on top", "positioned on" or "positioned atop" mean that a first element, such as a first structure, is present on a second element, such as a second structure, wherein intervening elements, such as an interface structure may be present between the first element and the second element. The term "direct contact" means that a first element, such as a first structure, and a second element, such as a second structure, are connected without any intermediary conducting, insulating or semiconductor layers at the interface of the two elements.

FIG. 1A is a functional block diagram of a tape appliance 100, in accordance with an embodiment of the invention. In an exemplary embodiment, tape appliance 100 may be a tape drive. Tape appliance 100 may include several components providing a control and data transfer system for reading and writing data from a host CPU 102, an embodiment of which is described below in relation to FIG. 8, on a magnetic tape medium. By way of example only, those components may include a channel adapter 104, a computer, such as microprocessor controller 106, a data buffer 108, a read/write data flow circuit 112, a motion control system 110, and a tape interface system 114 that includes a motor driver circuit 116 and read/write heads 118.

Microprocessor controller 106 may provide overall control functionality for the operations of all other components of tape appliance 100. The functions performed by microprocessor controller 106 may be programmable via microcode routines (not shown) according to desired tape drive operational characteristics. During data write operations (with all dataflow being reversed for data read operations), microprocessor controller 106 activates channel adapter 104 to perform the required host interface protocol for receiving an information data block. Channel adapter 104 communicates the data block to the data buffer 108 that stores the data for subsequent read/write processing. Data buffer 108 in turn communicates the data block received from channel adapter 104 to read/write dataflow circuitry 112, which formats the device data into physically formatted data that may be recorded on a magnetic tape medium. Read/write dataflow circuitry 112 is responsible for executing all read/write data transfer operations under the control of microprocessor controller 106. Formatted physical data from read/write circuitry 112 is communicated to tape interface system 114. The latter includes one or more read/write modules in read/write head unit 118, and drive motor components (not shown) for performing forward and reverse movement of a tape medium 120 mounted on a supply reel 122 and a take-up reel 124. The drive components of tape interface system 114 are controlled by motion control system 110 and motor driver circuit 116 to execute such tape movements as forward and reverse recording and playback, rewind and other tape motion functions. In addition, in multi-track tape drive systems, motion control system 110 transversely positions read/write heads 118 relative to the direction of longitudinal tape movement in order to record data in a plurality of tracks.

In certain embodiments, during read operations, microprocessor controller 106 may receive the unformatted electrical signals from tape interface system 114, either directly or via read dataflow circuitry 112. In other embodiments, read dataflow circuitry 112 may perform various pre-processing functions on the electrical signals from tape interface system 114, and transmit information that is representative of the electrical signals to microprocessor controller 106. In these embodiments, microprocessor controller 106 may include appropriate electrical circuitry, logic, firmware, software, etc., to perform analysis of the electrical signals or information to determine various characteristics of the signals related to quality of the recorded data and the magnetic medium, in accordance with embodiments of the invention. In general, the appropriate electrical circuitry, logic, firmware, software, etc., to perform analysis of the electrical signals to determine various characteristics of the signals related to quality of the recorded data and the magnetic medium may be located in one or more functional components of a tape appliance, such as tape appliance 100, and/or in a host computer, such as host CPU 102.

Figure 1B:
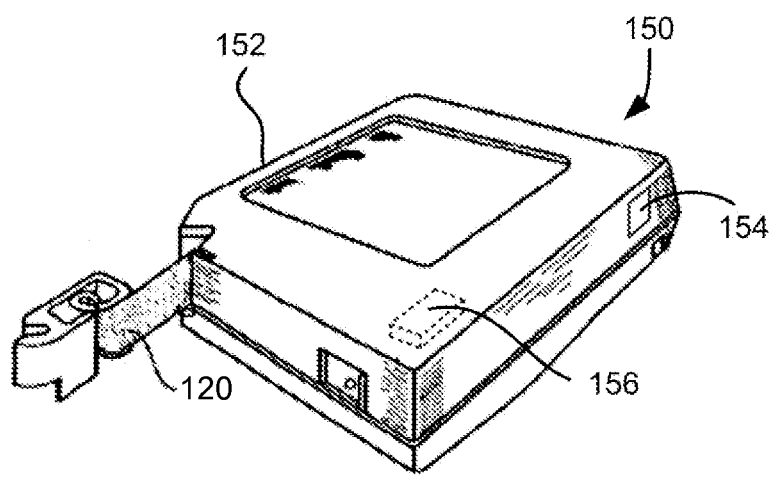
FIG. 1B illustrates an exemplary tape cartridge, in accordance with an embodiment of the present invention.

FIG. 1B illustrates an exemplary tape cartridge 150 according to an embodiment. Tape cartridge 150 may be used with a system such as tape appliance 100 shown in FIG. 1A. As shown, tape cartridge 150 includes a housing 152, a tape 120 in the housing 152, and a nonvolatile memory 156 coupled to the housing 152. In some embodiments, the nonvolatile memory 156 may be embedded inside the housing 152. In other embodiments, the nonvolatile memory 156 may be attached to the inside or outside of the housing 152 without modification of the housing 152. For example, the nonvolatile memory may be embedded in a self-adhesive label 154. In one preferred embodiment, the nonvolatile memory 156 may be a flash memory device, ROM device, etc., embedded into or coupled to the inside or outside of the tape cartridge 150. The nonvolatile memory may be accessible by tape appliance 100, and the tape operating software (the driver software) residing on host CPU 102. In an exemplary embodiment, tape cartridge 150 meets the standards specifications of one or more of the Linear Tape Open (LTO) generations, such as LTO-6. All trademarks used herein are the property of their respective owners. In such an embodiment, supply reel 122 may be integral to the LTO tape cartridge, and the end of tape 120 includes a leader pin (not shown) which is mechanically grasped by features (not shown) of tape interface system 114 and threaded onto tape-up reel 124.

Figure 2A:
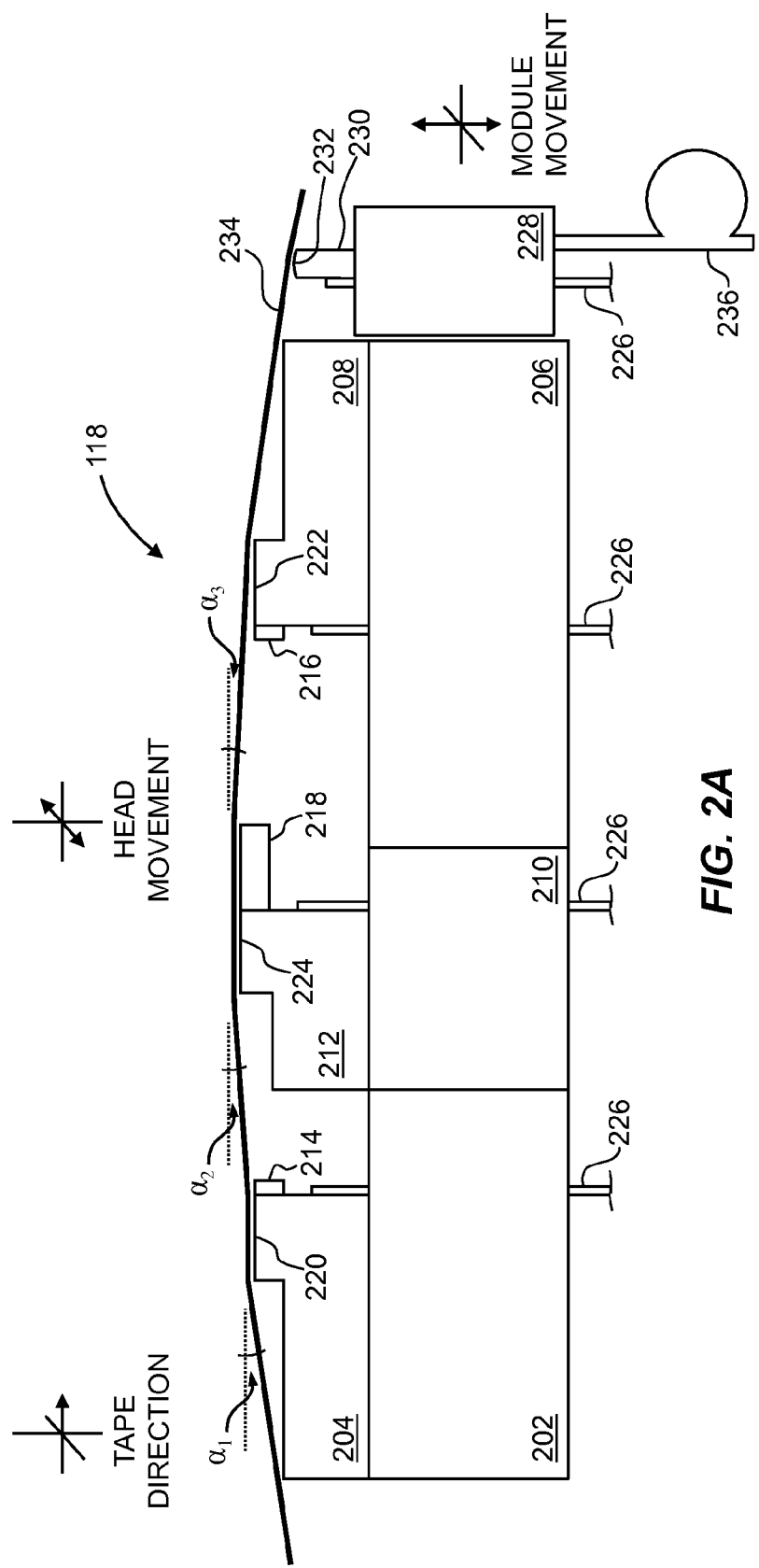
FIG. 2A illustrates a side view of a read/write head, in accordance with an embodiment of the invention.

FIG. 2A illustrates a side view of a read/write head 118 in accordance with an embodiment of the invention. Read/write head 118 includes first, second and third modules 204, 212, and 208, respectively, mounted to bases 202, 210, and 206, respectively. The bases may be "U-beams" that are physically coupled together. First, second and third modules 204, 212, and 208 each have a tape bearing surface 220, 224, and 222 respectively, which may be flat, contoured, etc. Each module 204, 212, and 208 may be configured for writing and/or reading data, for example, data received from or transmitted to host CPU 102, to and from a tape 234. Modules 204, 212, 208 may receive data for writing and transmit data that is read via cables 226, which may couple the modules to read dataflow circuitry 112. Note that while the term "tape bearing surface" appears to imply that the surface facing tape 234 is in physical contact with the tape bearing surface, this is not necessarily the case. Rather, only a portion of the tape may be in contact with the tape bearing surface, constantly or intermittently, with other portions of the tape "flying" above the tape bearing surface on a layer of air, usually referred to as an "air bearing." By way of explanation, first module 204 can be referred to as the "leading" module as it is the first module encountered by tape 234 when moving from left to right, as illustrated. Second module 212 can be referred to as the "middle" module, and third module 208 can be referred to as the "trailing" module. The leading and trailing modules 204 and 208, respectively, are referred to collectively as outer modules. Note that outer modules 204 and 208 will alternate as leading modules, depending on the direction of travel of the tape 234.

In an exemplary embodiment, closures 214, 218, and 216 are attached to modules 204, 212, and 208, respectively, and serve to extend tape bearing surfaces 220, 224, and 222, and to define gaps at the junctions of the modules and closures in which tape read and write elements, described in more detail below, are disposed. Locating the read and write elements interior to the edges of the tape bearing surfaces may serve to reduce wear and tear of the read/write elements resulting from direct contact from tape 234. Modules 204, 212, and 208, and closures 214, 218, and 216 may be made of a wear resistant substrate material, such as a ceramic. In some embodiments, middle module 212 has a closure, while the outer modules 204, 208 do not. Where there is no closure, preferably a hard coating is added to the module. One preferred coating is diamond-like carbon (DLC).

In one embodiment, tape bearing surfaces 220, 224, and 222 of the first, second and third modules 204, 212, and 208, respectively, lie on approximately parallel planes, with tape bearing surface 224 of the middle module 212 being slightly above tape bearing surfaces 220 and 222 of the outer modules 204 and 208. As described below, this has the effect of creating a desired wrap angle $\alpha_2$ of the tape relative to the tape bearing surface 224 of the middle module 212.

Tape bearing surfaces 220 and 222 may include sharp outer edges, or "skiving" edges, where tape 234 will first contact tape bearing surfaces 220 and 222 when either outer module 204 and 208 is the leading module. The skiving edges serve to "shear" air from the underside of tape 234 to prevent air from being drawn into the head-tape gap by the tape, so that atmospheric pressure may push the tape into substantially full contact, i.e., with a small tape fly height, over the longitudinal dimension, with respect to tape direction, of the tape bearing surfaces. A small amount of roundness or slope at the incoming edge may generate an unacceptably thick air bearing, separating the tape from the head, and its read/write elements, as described below, and present problems in reading and writing high density recordings due to spacing loss effects.

Where the tape bearing surfaces 220, 224, and 222 lie along approximately parallel offset planes, the vacuum created by the skiving edge of tape bearing surface 220 of the leading module 204 results in the trailing edge of tape bearing surface 220 (the edge from which the tape leaves the leading module 204) being the approximate reference point which defines the wrap angle $\alpha_2$ over the tape bearing surface 224 of the second module 212. Because the tape stays in close proximity to tape bearing surface 220 until close to its trailing, read and/or write elements, described in more detail below, may be located near the trailing, or inner, edges of the outer modules 204, 208.

A benefit of this and similar embodiments is that, because the tape bearing surfaces 220 and 222 of outer modules 204, 208 are fixed at a determined vertical offset from the tape bearing surface 224 of the middle module 212, the inner wrap angle $\alpha_2$ is fixed when modules 204, 212, and 208 are physically coupled together or are otherwise fixed into a head assembly. The inner wrap angle $\alpha_2$ is approximately tan-1 ($\delta$/W) where $\delta$ is the height difference between the planes of the tape bearing surfaces 220 and 224, and W is the width between the opposing ends of the tape bearing surfaces 220 and 224. An illustrative inner wrap angle $\alpha_2$ is in a range of about 0.5° to about 1.1°, though can be any angle that is advantageous to a design. Beneficially, the inner wrap angle $\alpha_2$ on the side of middle module 212 receiving the tape (leading edge) will be larger than the inner wrap angle $\alpha_3$ on the trailing edge, as the tape 234 rides above tape bearing surface 222 of trailing module 208. This difference is generally beneficial as a smaller $\alpha_3$ tends to oppose what has heretofore been a steeper exiting effective wrap angle.

Note that the tape bearing surfaces 220, 222 of the outer modules 204, 208 are positioned to achieve a negative wrap angle at the trailing edge of the tape bearing surface 220 of the leading module 204. This is generally beneficial in helping to reduce friction due to contact with the trailing edge, provided that proper consideration is given to the location of the "crowbar" region, where the tape forms a slight bubble, that forms in the tape where it peels off the head. This negative wrap angle also reduces flutter and scrubbing damage to the elements on leading module 204. Further, at trailing module 208, tape 234 flies over the tape bearing surface 222 so there is virtually no wear on the elements when tape is moving in this direction. Particularly, tape 234 entrains air and so will not significantly ride on the tape bearing surface 222 of the trailing module 208 (although some contact may occur). This is permissible in certain embodiments, for example, where the leading module writes onto the tape, the middle module may perform a read-after-write function, and the trailing module 208 is idle.

Writing and reading functions may be performed by different modules at any given time. In one embodiment, middle module 212 includes a plurality of data and optional servo readers and no data writers. Outer modules 204, 208 may include a plurality of writers and no readers, with the exception that outer modules 204, 208 may include optional servo readers. The servo readers may be used to laterally position the head, with respect to tape direction, during reading and/or writing operations.

In the embodiment illustrated in FIG. 2A, first, modules 204, 212, 208 each have a closure 214, 218, 216, which extends the tape bearing surface of the associated module, thereby effectively positioning the read/write elements away from the edge of the tape bearing surface. Closure 218 on second module 214 can be a ceramic closure of a type typically found on tape heads. The closures 214, 216 of the outer modules 204, 208, however, may be shorter than closure 218 of second module 212 as measured parallel to a direction of tape travel over the respective module. This enables positioning the modules closer together. One way to produce shorter closures 214, 216 is to lap the standard ceramic closures of the second module 212 an additional amount. Another way is to plate or deposit thin film closures above the elements during thin film processing. For example, a thin film closure of a hard material such as Sendust or nickel-iron alloy (e.g., 45/55) can be formed on the module.

With reduced-thickness ceramic or thin film closures 214, 216 or no closures on the outer modules 204, 208, the write-to-read gap spacing can be reduced to less than about 1 mm, e.g., about 0.75 mm, or 50% less than standard LTO tape head spacing. The open space between the modules 204, 212, 208 can still be set to approximately 0.5 to 0.6 mm, which in some embodiments is ideal for stabilizing tape motion over the second module 212.

In alternative embodiments, depending on tape tension and stiffness, it may be desirable to angle the tape bearing surfaces of the outer modules relative to the tape bearing surface of the middle module. For example, the tape bearing surfaces of the outer modules may be about parallel to the tape at the desired wrap angle $\alpha_2$ of the middle module. In other words, the planes of the tape bearing surfaces of the outer modules are oriented at about the desired wrap angle $\alpha_2$ of the tape relative to the middle module. The tape will also pop off of the trailing module in this embodiment, thereby reducing wear on the elements in the trailing module. These embodiments are particularly useful for write-read-write applications. Additional aspects of these embodiments are similar to those given above.

In operation, as tape 234 passes over the read and write elements in tape bearing surfaces 220, 224, 222 of read/write head 118, motion control system 110 transversely positions read/write heads 118 relative to the direction of longitudinal tape movement in order to read data from or write data to the data tracks in a particular data band of tape 234, as will be described in more detail below.

Read/write heads 118 also includes a supplemental module 230 on a mount 228. A cable 226 may couple supplemental module 230 to read dataflow circuitry 112 for transmitting data read by or to be written by the supplemental module. In certain embodiments of the invention, supplemental module 228 is coupled to the modules of read/write heads 118 such that supplemental module 230 follows the lateral movements of modules 204, 212, 208, and additionally may independently move at least along an axis perpendicular to the plane of the tape above tape bearing surface 232 of the supplemental module. Generally, this movement can be referred to as "vertical" movement. Thus, although the vertical movement of supplemental module 230 may not be strictly perpendicular to the plane of the tape above the supplemental module, at least one component of the movement is perpendicular to the plane of the tape, such that vertical movement of module 230 will bring tape bearing surface 232, and the read elements therein, as described in more detail below, into and out of engagement with tape 234.

Actuation of the vertical movement of supplemental module 230 may be performed, for example, by a precision servo mechanism 236 coupled to base 228 of supplemental module 230, controlled by motion control system 110 and microprocessor controller 106, and, optionally by host CPU 102. To ensure that supplemental module 230 precisely follows the lateral movements of modules 204, 212, 208, base 228 of the supplemental module may, for example, be coupled directly to base 206, via a tongue-and-groove arrangement, a dovetail-rail arrangement, or another suitable structure or arrangement that allows vertical movement of supplemental module 230 while ensuring that supplemental module 230 precisely follows the lateral movements of modules 204, 212, 208. Base 228 may alternatively, or additionally, be indirectly coupled to modules 204, 212, 208 by, for example, being coupled to a common support structure. For example, the axis of vertical movement of supplemental module 230 may be controlled by a shaft- and hole arrangement, with one component integral to the common support, and the other integral to base 228. In other embodiments, supplemental module 230 may not be tightly coupled to modules 204, 212, 208, and may perform track following functions, under control, for example, of motion control system 110, independent of modules 204, 212, 208, as may be known in the art.

Figure 2B:
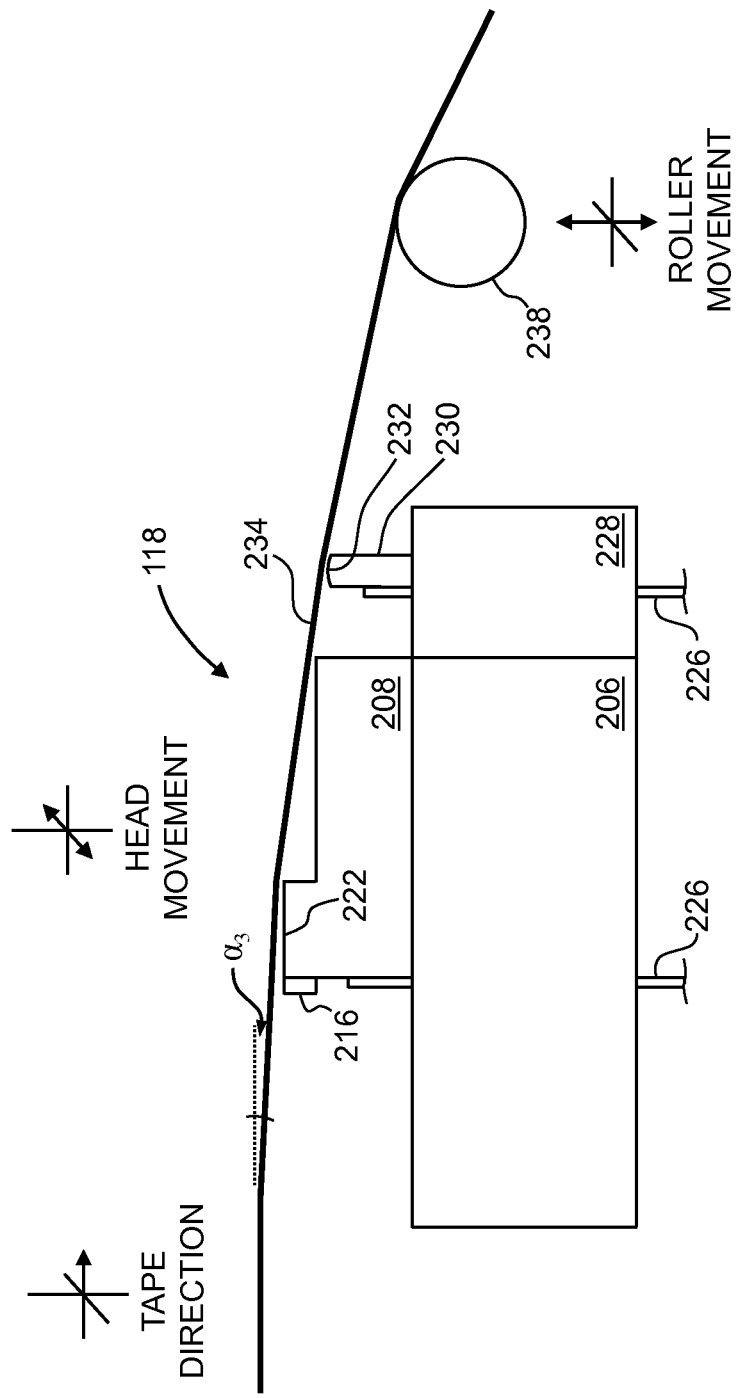
FIG. 2B illustrates a side view of a read/write head, in accordance with another embodiment of the invention.

In an alternative embodiment, illustrated in FIG. 2B, supplemental module 230 may be fixed in relation to modules 204, 212, 208, and tape 234 may be lifted off of, or lowered onto, tape bearing surface 232 of the supplemental module. For example, a precision controlled roller or guide 238, disposed along the tape path between supplemental module 232 and, for example, a capstan/pinch roller assembly (not shown), may lift and lower tape 232, under the control of motion controller 110, microprocessor controller 106, and, optionally, host CPU 102. With respect to the aspect of embodiments in which tape 234 periodically engages supplemental module 230, this alternative embodiment may satisfactorily implement this aspect. In a further embodiment, a combination of vertically moving supplemental module 232 and lifting and lowering tape 234 may also satisfy this aspect. In general, any arrangement which allows for tape 234 to periodically engage supplemental module 230, in accordance with embodiments of the invention, may be used.

In certain embodiments, engaging tape 234 with supplemental module 230 will not adversely interfere with normal tape read/write operations of modules 204, 212, and 208. For example, engaging tape 234 with supplemental module 230 may affect the wrap angle at the edge of tape bearing surface 222 nearest supplemental module 230. With the tape direction as indicated, engaging the tape may not affect wrap angles $\alpha_1$ and $\alpha_2$, as illustrated. Because trailing module 208 is idle when the tape direction is as indicated, engaging the tape may not interfere with normal tape read/write operations of modules 204 and 212. In contrast, if the tape direction is in the opposite direction to what is indicated, the effect of engaging the tape at the wrap angles at the now-leading edges of tape bearing surfaces 222 and 218 may adversely affect the normal tape read/write operations of modules 208 and 212. In this embodiment, engaging tape 234 with supplemental module 230 might only occur when the tape is moving in the direction indicated.

When supplemental tape 234 is engaged with supplemental module 230, sufficient pressure is exerted by the supplemental module on the tape to ensure a satisfactory contact of the tape with tape bearing surface 232, in which read elements are disposed. This pressure may depend on such factors as the relative geometries of tape bearing surface 232 and tape 234, an acceptable thickness of an air bearing, an acceptable amount of actual (asperity) contact under pressure between the tape and the tape bearing surface, etc. In various embodiments, the tape pressure on tape bearing surface 232, as well as the tape pressure on tape bearing surfaces 220, 224, 222, may range, for example from 10 to 100 kPa.

In the embodiment of FIGS. 2A and 2B, supplemental module 230 is illustrated as having at least a partially beveled tape bearing surface 232. In other embodiments, tape bearing surface 232 may be planar, and/or may be oriented such that the surface is coplanar, approximately coplanar, are at a desired wrap angle, to the plane of tape 234 when tape bearing surface 232 engages tape 234. Other embodiments may include different geometries of tape bearing surface 232, such as flat, contoured, etc., and angles of engagement between tape bearing surface 232 and tape 234, to affect, for example, the degree of contact between tape bearing surface 232 and tape 234.

Figure 3:
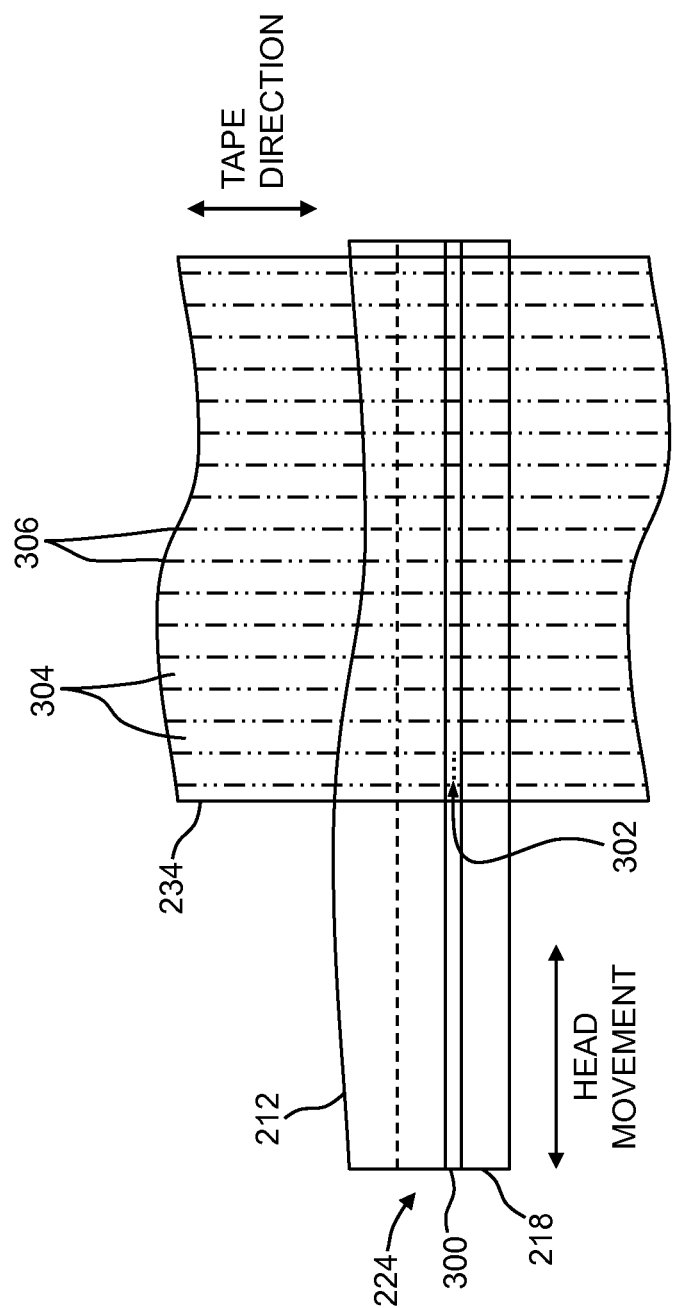
FIG. 3 illustrates a representative tape bearing surface of a module, in accordance with an embodiment of the present invention.

FIG. 3 illustrates a representative tape bearing surface 224 of module 212, from the perspective of a downward view, in accordance with an embodiment of the present invention. A representative tape 234 is shown, with servo tracks 306 indicated in dashed lines, and data bands 304 between the servo tracks 306. In this example, tape 234 includes 4 to 22 data bands 304, e.g., with 16 data bands 304 and 17 servo tracks 306, on a one-half inch wide tape 234. Each data band may include a number of data tracks, for example 1024 data tracks (not shown). Module 204 is preferably long enough to be able to support tape 234 as the head steps between data bands 304. During read/write operations, read and/or write elements of read/write element array 302, disposed in a gap 300 of tape bearing surface 224 of module 212 where the tape bearing surface of closure 218 abuts module 224, are positioned to specific track positions within one of the data bands 304. Outer read elements of read/write element array 302, which may be referred to as servo readers, read the servo tracks 306. The servo signals generated by the servo readers and received by motion control system 110 are used to align the read and/or write elements 302 with a particular set of data tracks during read/write operations.

Figure 4:
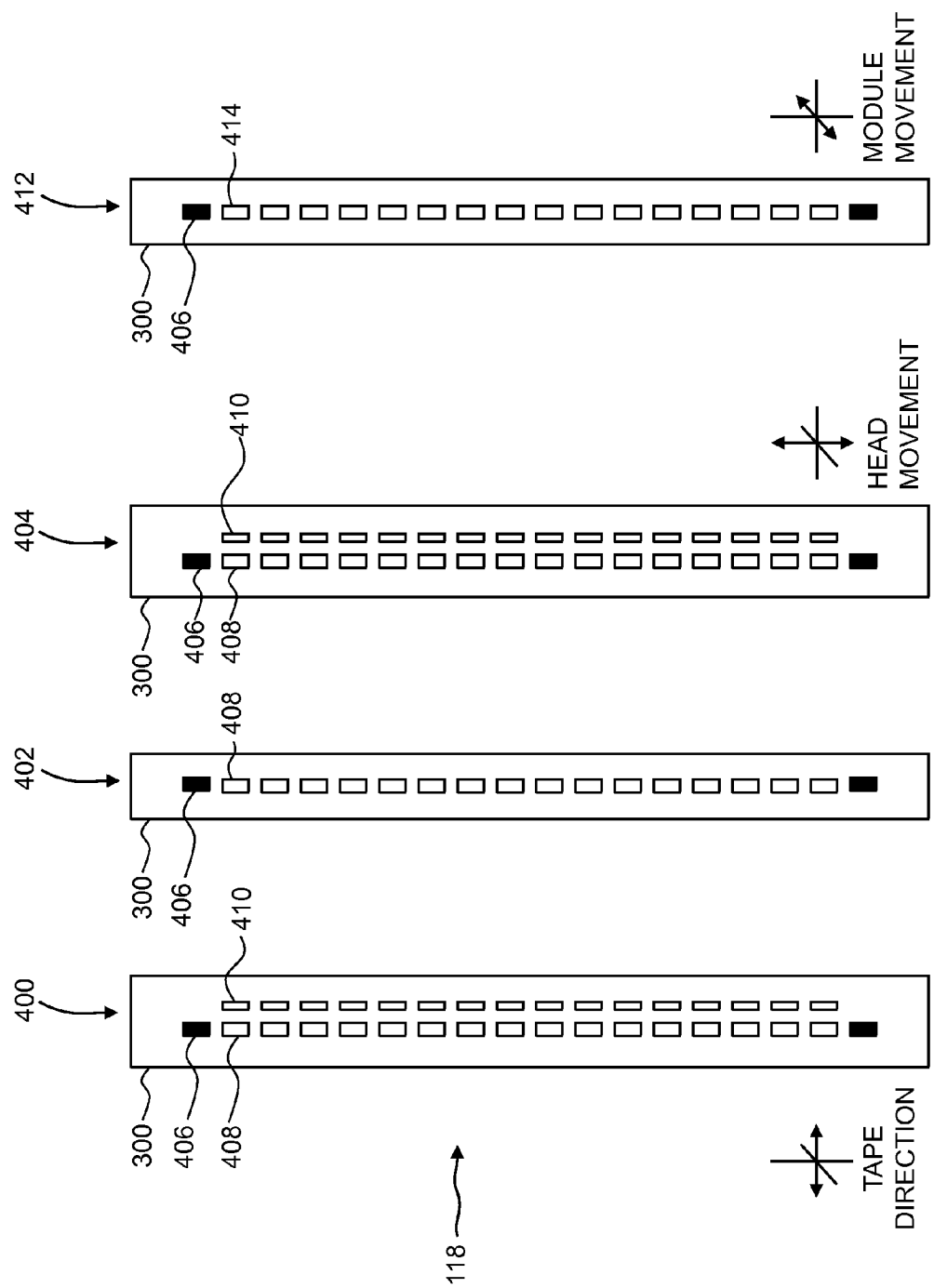
FIG. 4 illustrates read and/or write element arrays, in accordance with an embodiment of the present invention.

FIG. 4 depicts read and/or write element arrays 400, 402, 404, and 412 of read/write heads 118, which may be formed, for example, in gaps 300 of modules 204, 212, 208, and supplemental module 228. As shown, the read and/or write element arrays may include, for example, 16 read elements 408 or 414, 16 write elements 410, and two servo readers 406, though the number of elements may vary. Illustrative embodiments may include 8, 16, 32, 40, or 64 active read and/or write elements per array, and alternatively interleaved designs having odd numbers of read or write elements such as 17, 25, 33, etc. An illustrative embodiment includes 32 read elements per array and/or 32 write elements per array, where the actual number of transducer elements could be greater, e.g., 33, 34, etc. This may allow the tape to travel more slowly, thereby reducing speed-induced tracking and mechanical difficulties and/or execute fewer "wraps" to fill or read the tape. While the read and write elements may be arranged in a "piggyback" configuration as shown in FIG. 4, for example, in read/write element arrays 400 and 404, the read elements 408 and write elements 410 may also be arranged in an interleaved configuration. Alternatively, each array of read and/or write elements 400, 402, 404 may be read or write elements only, and the arrays may contain one or more servo readers 406. Each module 204, 212, 208 may include a complementary set of read and/or write elements for such things as bi-directional reading and writing, read-while-write capability, backward compatibility, etc.

In exemplary embodiments of the invention, read element array 412 is disposed in tape bearing surface 232 of supplemental module 230. In certain embodiments, read elements 414 of element array 412 may be fabricated differently than, and have difference performance characteristics than, read elements 408 of read/write arrays 400, 402, and 404. Read element array may include one or more servo readers 406 for reading, for example, servo tracks 306, for transverse positioning of supplemental module 230 with respect to, for example, data bands 304. As indicated in FIG. 4, in certain embodiments, supplemental module 230 may also move in a "vertical" direction (into and out of the page as illustrated), as well as in a transverse direction, with respect to the tape direction.

Figure 5:
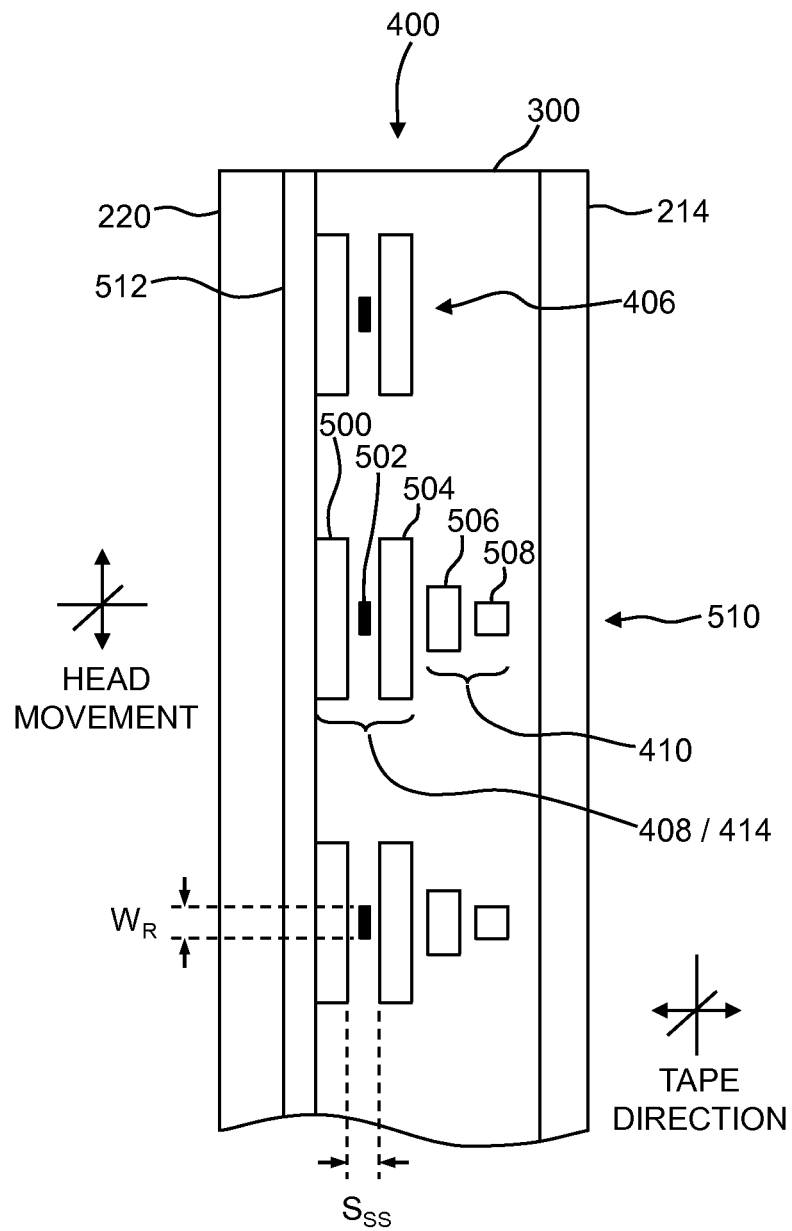
FIG. 5 illustrates a representative partial tape bearing surface, illustrating a read/write element array in additional detail, in accordance with an embodiment of the present invention.

FIG. 5 shows a representative partial tape bearing surface 220 of module 204 of read/write head heads 118, from the perspective of a downward view, illustrating representative read/write element array 400 in additional detail, in accordance with an embodiment. A read/write element array 400 may have a plurality of read/write element (R/W) pairs 510 in a piggyback configuration formed, for example, on the substrate material of module 204 and an optional electrically insulative layer 512. The write elements, exemplified by write element 410, and the read elements, exemplified by read element 408, are aligned parallel to the direction of travel of a tape medium to form a R/W pair 510. Several R/W pairs 510 may be present, such as 8, 16, 32 pairs, etc. The R/W pairs 510 as shown are linearly aligned in a direction generally perpendicular to the direction of tape travel. However, the pairs may also be aligned diagonally, etc. Servo readers 406 are positioned on the outside of the array of R/W pairs 510.

Generally, the magnetic tape medium may move transversely across read/write element arrays 400, 402, 404, and 412, in either direction, and read/write heads 118 may be moved laterally, with respect to the tape direction, between data tracks and data bands 304 on the tape. The magnetic tape medium and read and/or write element arrays 400, 402, 404, and 412 operate in a transducing relationship in a manner known in the art.

In an embodiment, when a module is constructed, for example, module 204, layers are formed in the gap 300 created above the electrically conductive substrate material of module 204 (partially shown), e.g., of AlTiC, in generally the following order for the R/W pairs 510, and similarly for servo readers 406 (however, without the writer poles): an insulating layer 512; a first shield 500 typically of an iron alloy such as NiFe, CZT or Al—Fe—Si (Sendust); a sensor 502 for sensing a data track on a magnetic medium of any known type, including those based on magnetoresistance (MR), giant MR (GMR), anisotropic MR (AMR), tunneling MR (TMR), etc.; a second shield 504 typically of a nickel-iron alloy (e.g., ~80/20 at % NiFe, also known as permalloy); first and second writer pole tips 506, 508, and a coil (not shown). First and second writer poles 506, 508 may be fabricated from high magnetic moment materials such as ~45/55 NiFe. In preferred embodiments, due to its high magnetoresistive change and superior signaling characteristics, at least sensors 502 of supplemental module 230 are TMR sensors.

Note that these materials are provided by way of example only, and other materials may be used. Additional layers such as insulation between the shields and/or pole tips and an insulation layer surrounding the sensor may be present. Illustrative materials for the insulation include alumina and other oxides, insulative polymers, etc. Materials and construction of read elements 414, and read element array 412, of supplemental module 230 may be directed to a specific generation of tape media, and may be optimized for a degree of longevity, to reduce buildup of debris, and/or other performance considerations.

Although read/write element array 400 includes R/W pairs 510, read/write element arrays may include only read elements or only write elements. For example, in the embodiment illustrated in FIG. 4, read/write element array 402 of module 212, and read/write element array 412 of supplemental module 230, include only read elements. Other embodiments may include different combinations read/write element arrays, to enable, for example, write-read-read (W-R-R) operations, R-R-W operations, read-after-write operations, etc. One skilled in the art will appreciate that the concepts presented as applied to the embodiments disclosed would apply to configurations other than those illustrated.

With specific regard to read element array 412 of supplemental module 230, in various embodiments, read elements 414 may be constructed in the same manner, generally described above, as read elements 408 in read/write arrays 400, 402, 404. However, read elements 414 need not be constructed in the same manner as read elements 408, and thus need not have the same performance characteristics. For example, read element array 412 of supplemental module 232 may be optimized for a specific generation of a tape medium.

For example, read sensor width WR, and read sensor shield-to-shield spacing $S_{SS}$, as illustrated on FIG. 5 (and FIGS. 6A and 6B), may be optimized for track density, linear density (bits/inch), head-to-tape spacing, and/or other physical and magnetic properties of a particular generation of tape, for example, LTO-6. In an exemplary embodiment, shield-to-shield spacing $S_{SS}$ may have a nominal value of about 100 nm, and read sensor width WR may have a nominal value of about 1-3 μm. More generally, the shield-to-shield spacing $S_{SS}$ scales with the bit length, as is known in the art, and the reader width may be in the range of 40-80 percent of the track width.

In various embodiments, meeting a particular nominal or other read sensor, read element, and/or read element array dimension, or other construction characteristic, may be less important than knowing the actual dimensions or characteristics of the sensor, element, or array. For example, the magnetic field strength at a sensor is generally proportional to the width of the read sensor, and decreases exponentially with respect to the element-to-tape spacing. If the sensor width, tape spacing, and response and sensitivity curves of the read sensor are known, a very accurate magnetic field strength measurement of the tape transitions may be obtained from an analysis of the electrical signals from the read sensor. In an embodiment, all read sensors in a read element array may be chosen to have substantially the same dimensions and/or characteristics through, for example, a binning process, or by physical measurements.

In addition to optimizing materials and construction of read elements 414 for a specific generation of tape media, materials and construction of the read elements maybe optimized for a desired performance. For example, materials and construction may be optimized for a level of read element sensitivity, for a level of longevity, to reduce buildup of debris, and/or other performance considerations, with emphasis on one or more of these performance characteristics.

Figure 6A:
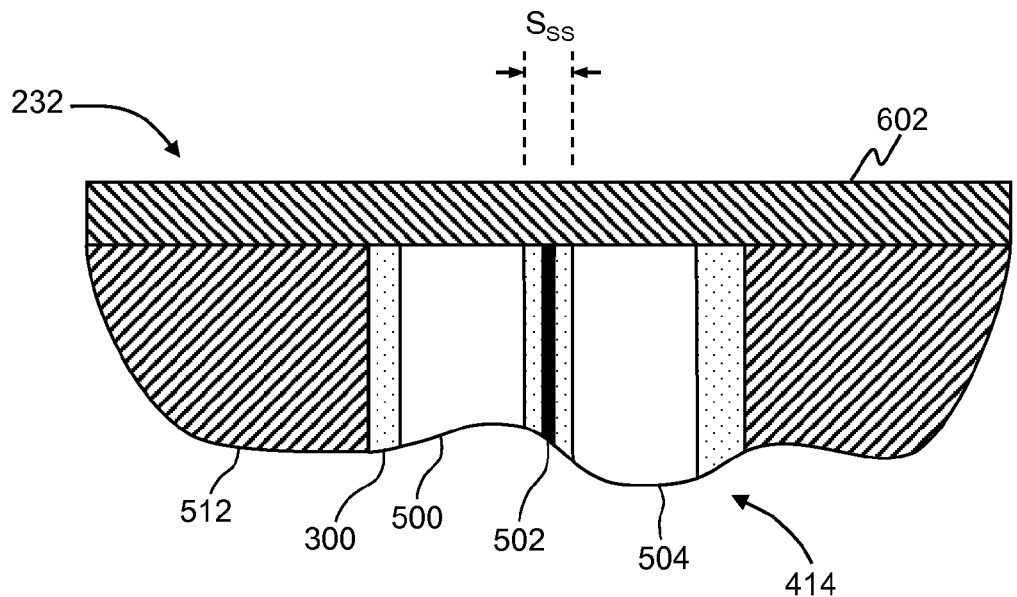
FIG. 6A illustrates construction of a read element, in accordance with an embodiment of the present invention.
Figure 6B:
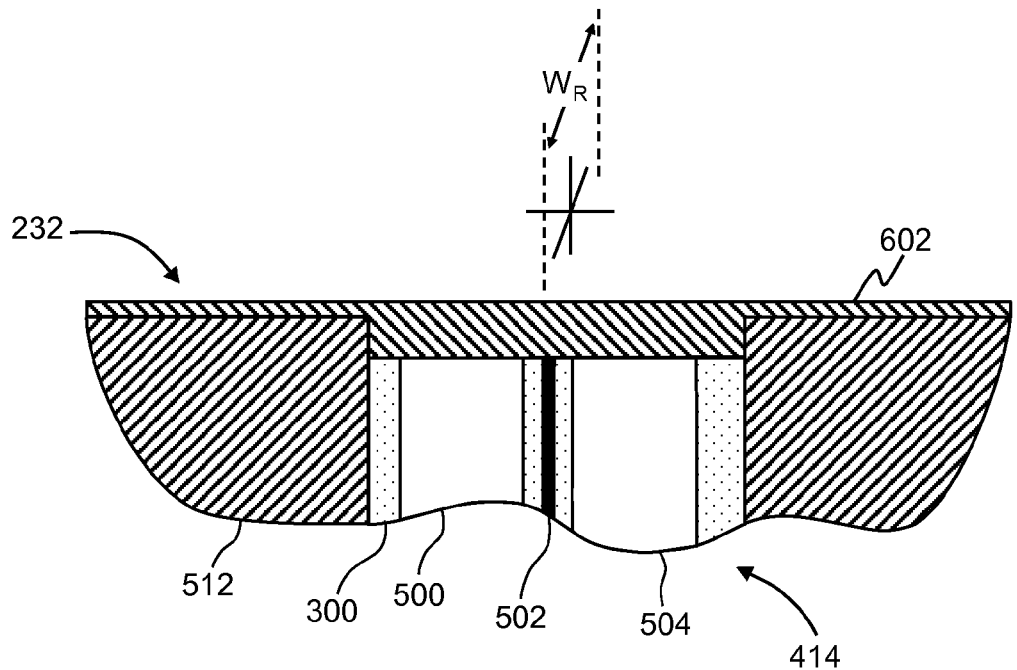
FIG. 6B illustrates construction of a read element, in accordance with another embodiment of the present invention.

For example, in certain embodiments, as illustrated in FIG. 6A, a coating 602 may be applied to a read element 414 of the supplemental module 230 during construction so as to force a defined separation between tape bearing surface 232, and thus sensor 502 of the read element, and the tape. The separation will typically be a combination of the coating 602 depth plus the tape fly height over tape bearing surface 232. In certain embodiments, as illustrated by FIG. 6B, sensor 502 may be recessed a defined amount from tape bearing surface 232. The defined separation may force an extra degree of spacing loss in the magnetic field strength detected by read elements 414 of read element array 412 such that, for example, the signal resolution may be at or close to the minimum acceptable value, and may be used to detect sub-optimal, but within specification, performance of the read/write element arrays of the other read/write modules. In certain embodiments, coating 602 may be diamond-like carbon.

Based on the Wallace thickness loss response function, the magnetic field strength detected by a read element is proportional to $e^{-kd/\lambda}$, where d is the element-to-tape separation, $\lambda$ is the recording wavelength, and k is a constant equal to $2\pi f/s$, where f=recording frequency, and s=tape speed in recording. Thus, the detected magnetic field strength decreases exponentially both with respect to separation between the tape and the read element, and with respect to recording density, which is inversely related to the recording wavelength $\lambda$. Based on this relationship, a certain defined spacing can be implemented that may increase, or enhance, the spacing loss to force a certain BER or low SNR at a relatively low degradation of write element performance. Threshold values can be defined for one or more performance characteristics related to write element 410 degradation that can be detected by read elements 414, such that a detected performance characteristic above, or below, its related threshold value may indicate an unacceptable level of write element 410 degradation. In various embodiments, defined spacings between 5-50 nm may be used. A defined spacing, or range of spacings, may be determined without undue experimentation for a given tape media generation, a particular tape head 118 and supplemental head 230 construction, and/or a specific set of data written to the tape.

As described above, motion control system 110 may periodically activate, for example, a servo that vertically moves supplemental module 230, or, in another embodiment, rollers or guides, that cause the supplemental module to engage tape 234. In various embodiments, motion control system 110 may periodically cause the tape to engage the supplemental module, based on, for example, a duration that the tape drive is active, a specific length or distance of tape that passes over read/write heads 118, a number or a total duration of write operations performed by a tape drive, each time a write operation is initiated on a newly mounted tape, a defined number of wraps of the tape around supply reel 122 or take-up reel 124, or a combination of these. In general, motion control system 110 may periodically cause the tape to engage the supplemental module often enough that significant degradation of the write elements does not occur between each tape-to-supplemental head engagement, but not so often that physical wear of the supplemental module shortens the performance lifetime below a desired lifetime. In various embodiments, supplemental module 234 may engage tape 234 for a duration sufficient for tape appliance 100 to read several blocks of data, for example, 3 to 50 blocks.

In an embodiment, when motion control system 110 causes tape 234 to engage supplemental module 230, the signals generated by read element array 414, or corresponding information, may be transmitted to microprocessor controller 106. In an embodiment, microprocessor controller 106 includes firmware and/or software to process and analyze the signals from read element array 414, and determine whether certain performance characteristics of the write elements of read/write element arrays 400, 402, 404, are within desired ranges. In other embodiments, microprocessor controller 106 may only process the signals from read element array 414, and transmit the information to host CPU 102 for further analysis with regard to threshold values, by an analysis program, for example, one of application program(s) 828 (see FIG. 8) that may reside on host CPU 102. For example, read dataflow circuitry 112 may perform a pre-processing function on the signals it receives from each read element array, such as combining or averaging the signals from all or some of the read elements in an array, before sending this information to microprocessor controller 106. Similarly, microprocessor controller 106 may perform pre-processing or a degree of pre-analysis before sending signals and other information from the read element arrays to host CPU 102. In certain embodiments, analysis may be performed on aggregated signals from a read sensor array. In other embodiments, analysis may be performed on signals from each read sensor of an array. When, for example, microprocessor controller 106 determines that a quality metric does not meet its associated threshold value, it may, for example, transmit a warning message to host CPU 102.

For example, the amplitude of the signals from read element array 414 may indicate the magnetic field strength of write elements 410 at tape 234. An amplitude below a threshold value may indicate physical wear of write elements 410, or may indicate a buildup of debris on the face of a read/write element array 400, 402, 404. Similarly, a low SNR in the signals from read element array 414 may indicate similar degradation of write elements 410.

When microprocessor controller 106 determines that a defined signal characteristic does not meet its associated threshold value, it may, for example, transmit a warning message to host CPU 102 indicating that operator intervention may be required, or cause operations on the tape drive to be suspended until the drive is reset.

While embodiments of the invention have been described with respect to a tape appliance and a tape medium, those of skill in the art will recognize that the inventive concepts described herein may be implemented in embodiments directed to related magnetic storage technologies, without undue experimentation, and without departing from the spirit of the invention, and these are, therefore, considered to be within the scope of the invention, as defined in the claims below. For example, with respect to hard disk drive (HDD) technology, a special purpose set of heads may be constructed having read elements of varying characteristics, as described above, for reading magnetic transitions in a data track in the magnetic media of an HDD platter. The same or similar quality metrics related to the magnetic transitions on the platter, and the quality of the platter itself, may be determined, based on established standards and specifications, and analysis of the electrical signals generated by the read elements of the special purpose heads.

Figure 7:
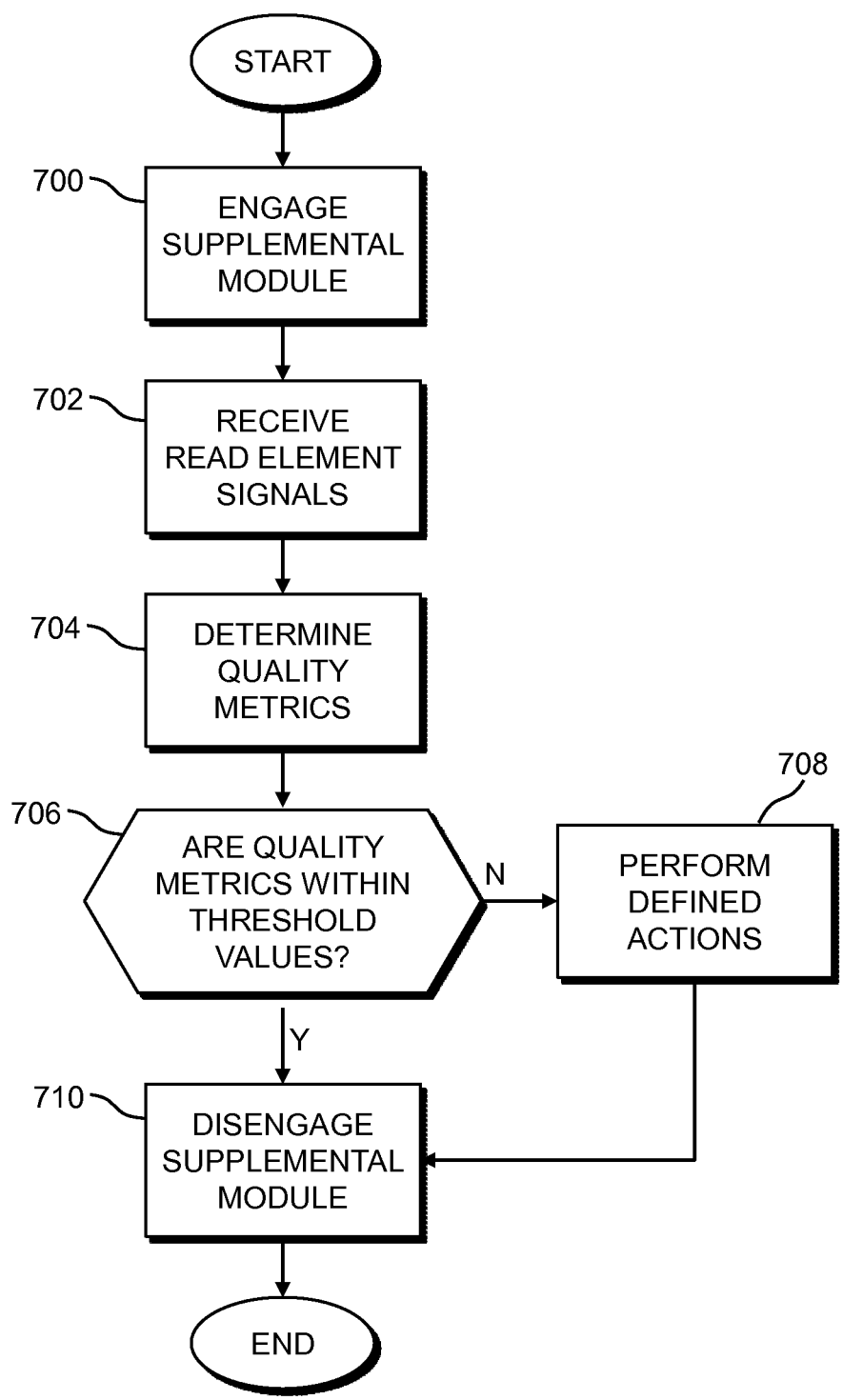
FIG. 7 is a flowchart depicting operational steps that a microprocessor may perform, in accordance with an embodiment of the invention.

FIG. 7 is a flowchart depicting operational steps that microprocessor controller 106 may perform in determining whether a write element 410 meets defined performance characteristics, in accordance with an embodiment of the invention. In an embodiment, microprocessor controller 106 periodically issues a command signal to motion control system 110, which in turn sends a control signal to a servo controlling the vertical movement of supplemental module 230, or, alternatively, to a servo controlling a tape roller or guide, to cause the supplemental module to engage the tape (step 700). Microprocessor controller 106 receives the electrical signals from, for example, read elements 414 of read element array 414 in tape bearing surface 232 of supplemental module 230 via a cable 226 (step 702). Microprocessor controller 106 determines various quality metric values based on the received electrical signals (step 704). Microprocessor controller 106 then compares the quality metric values to threshold values or ranges (decision step 706). In certain embodiments, these quality metric values may be retained, for example, by host CPU 102, for historical analysis.

If microprocessor controller 106 determines that one or more performance characteristics are not within a desired range (decision step 706, "N" branch), then the microprocessor controller performs certain defined actions (step 708). For example, if certain key performance characteristic are not meeting a defined threshold value, a message may be generated by microprocessor controller 106 and transmitted to host CPU 102, via channel adapter 104, to indicate that operator intervention may be required. Alternatively, microprocessor controller 106 may disable writing to tape by modules 204, 212, and/or 208, until tape appliance 100 is reset. Microprocessor controller 106 then issues command signals to cause supplemental module to disengage the tape (step 708), and this processing ends until a defined period has elapsed, whereupon this processing begins again (step 700).

If microprocessor controller 106 determines that all performance characteristics are within their associated desired ranges (decision step 706, "Y" branch), then the microprocessor controller issues command signals to cause supplemental module to disengage the tape (step 710), and this processing ends until a defined period has elapsed, whereupon this processing begins again (step 700).

Figure 8:
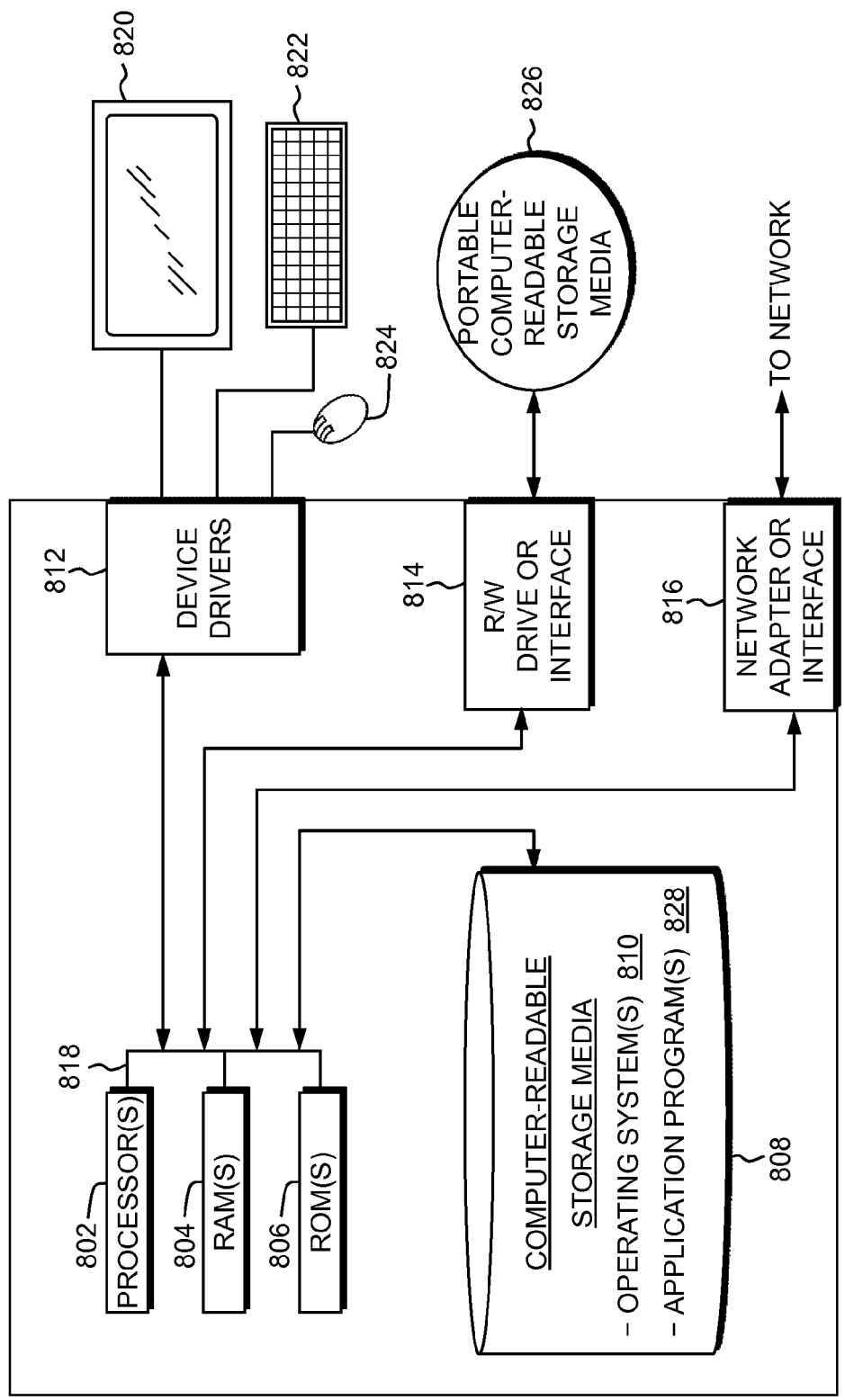
FIG. 8 illustrates a block diagram of components of a host, in accordance with an embodiment of the present invention.

FIG. 8 depicts a block diagram of components of host CPU 102, in accordance with an embodiment of the present invention. It should be appreciated that FIG. 8 provides only an illustration of one implementation and does not imply any limitations with regard to the environments in which different embodiments may be implemented. Many modifications to the depicted environment may be made.

Host CPU 102 can include one or more processors 802, one or more computer-readable RAMs 804, one or more computer-readable ROMs 806, one or more computer-readable storage media 808, device drivers 812, read/write drive or interface 814, network adapter or interface 816, all interconnected over a communications fabric 818. Communications fabric 818 can be implemented with any architecture designed for passing data and/or control information between processors (such as microprocessors, communications and network processors, etc.), system memory, peripheral devices, and any other hardware components within a system.

One or more operating systems 810 and application program(s) 828 are stored on one or more of the computer-readable storage media 808 for execution by one or more of the processors 802 via one or more of the respective RAMs 804 (which typically include cache memory). In the illustrated embodiment, each of the computer-readable storage media 808 can be a magnetic disk storage device of an internal hard drive, CD-ROM, DVD, memory stick, magnetic tape, magnetic disk, optical disk, a semiconductor storage device such as RAM, ROM, EPROM, flash memory or any other computer-readable tangible storage device that can store a computer program and digital information.

Host CPU 102 can also include a R/W drive or interface 814 to read from and write to one or more portable computer-readable storage media 826. Application program(s) 828 on host CPU 102 can be stored on one or more of the portable computer-readable storage media 826, read via the respective R/W drive or interface 814 and loaded into the respective computer-readable storage media 808.

Host CPU 102 can also include a network adapter or interface 816, such as a TCP/IP adapter card or wireless communication adapter (such as a 4G wireless communication adapter using OFDMA technology). Application program(s) on host CPU 102 can be downloaded to the computing device from an external computer or external storage device via a network (for example, the Internet, a local area network or other, wide area network or wireless network) and network adapter or interface 816. From the network adapter or interface 816, the programs are loaded into the computer-readable storage media 808. The network may comprise copper wires, optical fibers, wireless transmission, routers, firewalls, switches, gateway computers and/or edge servers.

Host CPU 102 can also include a display screen 820, a keyboard or keypad 822, and a computer mouse or touchpad 824. Device drivers 812 interface to display screen 820 for imaging, to keyboard or keypad 822, to computer mouse or touchpad 824, and/or to display screen 820 for pressure sensing of alphanumeric character entry and user selections. The device drivers 812, R/W drive or interface 814 and network adapter or interface 816 can comprise hardware and software (stored in computer-readable tangible storage device 808 and/or ROM 806).

The present invention may be a system, a method, and/or a computer program product. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Although preferred embodiments have been depicted and described in detail herein, it will be apparent to those skilled in the relevant art that various modifications, additions, substitutions and the like can be made without departing from the spirit of the invention, and these are, therefore, considered to be within the scope of the invention, as defined in the following claims.

What is claimed is:

1. An apparatus comprising:
a production module that is substantially in constant engagement with a magnetic tape recording medium, the production module including at least one write element that writes magnetic transitions to the magnetic tape;

a supplemental module, including at least one read element, that periodically engages the magnetic tape, whereby the read element generates an electrical signal corresponding to the transitions written to the magnetic tape by the at least one write element, the read element disposed a distance away from the tape when the supplemental module engages the tape such that a signal resolution measurement value is approximately a minimum acceptable value when the tape is a reference tape;

a computer that receives information representative of the electrical signal and determines if a quality metric of the magnetic tape derived from the electrical signal is within a defined range; and in response to determining that the quality metric is not within the defined range, performing a defined action.

2. An apparatus in accordance with claim 1, further comprising a servo coupled to the supplemental module, wherein activating the servo engages or disengages the supplemental module from the magnetic tape recording medium, independent of the production module.

3. An apparatus in accordance with claim 1, further comprising a tape roller or guide coupled to a servo, wherein activating the servo causes the tape roller or guide to engage or disengage the magnetic tape from the supplemental module.

4. An apparatus in accordance with claim 1, wherein the quality metric is one or more of: transition magnetic field strength at one or more bit densities, signal-to-noise ratio (SNR), transition parameter, PW-50 pulse width, bit error rate (BER), degree of overwrite.

5. An apparatus in accordance with claim 1, wherein the supplemental module includes a coating disposed over the read element having a thickness sufficient to cause the read element to be disposed the distance away from the magnetic tape when the supplemental module engages the magnetic tape.

6. An apparatus in accordance with claim 1, wherein the read element is recessed from a magnetic tape bearing surface of the supplemental module sufficient to cause the read element to be disposed the distance away from the magnetic tape when the supplemental module engages the tape.

7. An apparatus in accordance with claim 1, wherein the distance away from the tape magnetic is approximately between 5 and 50 nm.

8. An apparatus in accordance with claim 1, wherein the supplemental module periodically engages the magnetic tape one or more of: once per a defined number of wraps of the tape around a supply reel or take up reel, after a defined elapsed tape recording appliance operation time, after a defined tape length that moves across the tape head module, when a tape is loaded to the tape recording appliance, when a BER exceeds a threshold value.

9. An apparatus in accordance with claim 1, wherein the supplemental module periodically engages the magnetic tape recording medium sufficient for the supplemental module to read a defined number of data blocks from the magnetic tape recording medium.

10. An apparatus in accordance with claim 1, wherein the defined action is one or more of: transmitting a message signal indicating that the quality metric is not within the defined range, and disabling write operations by the write head.

* * * * *